United States Patent
Lehto

(10) Patent No.: US 6,798,749 B1
(45) Date of Patent: Sep. 28, 2004

(54) METHOD AND SYSTEM FOR THE MANAGEMENT OF AN INTERFACE IN A TELECOMMUNICATION SYSTEM

(75) Inventor: Pekka Lehto, Oulu (FI)

(73) Assignee: Nokia Corporation, Espoo (FI)

( * ) Notice: Subject to any disclaimer, the term of this patent is extended or adjusted under 35 U.S.C. 154(b) by 469 days.

(21) Appl. No.: 09/718,451

(22) Filed: Nov. 22, 2000

Related U.S. Application Data

(63) Continuation of application No. PCT/FI99/00480, filed on Jun. 1, 1999.

(30) Foreign Application Priority Data

Jun. 4, 1998 (FI) .................................................. 981281

(51) Int. Cl.$^7$ ........................... G01R 31/08; H04L 12/28
(52) U.S. Cl. ....................... 370/242; 370/227; 370/419; 370/395.3
(58) Field of Search ................................ 370/328, 329, 370/317, 228, 533, 216, 241, 245, 242, 248, 251, 225, 227, 522, 229, 395.3; 379/279, 220.01, 219, 221.15

(56) References Cited

U.S. PATENT DOCUMENTS

| | | | | |
|---|---|---|---|---|
| 5,822,420 A | * | 10/1998 | Bolon et al. .................. | 379/230 |
| 6,275,481 B1 | * | 8/2001 | Penttinen .................... | 370/329 |
| 6,278,688 B1 | * | 8/2001 | Suutari et al. ............... | 370/217 |
| 6,278,700 B1 | * | 8/2001 | Haster ......................... | 370/329 |
| 6,335,929 B1 | * | 1/2002 | Haster ......................... | 370/352 |
| 6,347,138 B1 | * | 2/2002 | Lallukka et al. ......... | 379/220.01 |
| 6,430,150 B1 | * | 8/2002 | Azuma et al. ............... | 370/218 |

FOREIGN PATENT DOCUMENTS

| | | |
|---|---|---|
| WO | WO 97/35404 | 9/1997 |
| WO | WO 98/09448 | 3/1998 |
| WO | WO 99/17560 | 4/1999 |
| WO | WO 99/48307 | 9/1999 |

OTHER PUBLICATIONS

ETS 300 377–1, "Signalling Protocols and Switching (SPS); Q3 interface at the Local Exchange (LE) for configuration management of V5 interfaces and associated customer profiles; Part 1: Q3 interface specification", *European Telecommunications Standards Institute*, pp. 1–111 (Dec. 1994).

ETS 300 324–1, "Signalling Protocols and Switching (SPS); V interfaces at the digital Local Exchange (LE) V5.1 interface for the support of Access Network (AN) Part 1: V5.1 interface specification", *European Telecommunications Standards Institute*, Feb. 1994.

ETS 300 347–1, "Signalling Protocols and Switching (SPS); V interfaces at the digital Local Exchange (LE) V5.2 interface for the support of Access Network (AN) Part 1: V5.2 interface specification", *European Telecommunications Standards Institute*, Sep. 1994.

* cited by examiner

*Primary Examiner*—Hanh Nguyen
(74) *Attorney, Agent, or Firm*—Squire, Sanders & Dempsey L.L.P.

(57) ABSTRACT

Method and system for the management of a V5 interface in a telecommunication system comprising a first network element, a second network element, which is connected via a V5 interface to the first network element, and a management interface connected to different network elements. Link identification is performed on the basis of a standard request issued from a network element. According to the invention, when link identification is requested via the management interface and when link identification cannot be started in the network element through whose management interface the link identification request is issued, a notice of failure of link identification is given locally to the management interface.

11 Claims, 3 Drawing Sheets

METHOD AND SYSTEM FOR THE MANAGEMENT OF AN INTERFACE IN A TELECOMMUNICATION SYSTEM

This application is a continuation of international application serial number PCT/FI99/00480, filed Jun. 1, 1999.

FIELD OF THE INVENTION

The present invention relates to telecommunication technology. In particular, the present relates to a new an improved method and system for the management of the interface between a local exchange and an access node.

BACKGROUND OF THE INVENTION

Open interfaces (V5.1 and V5.2) between an access network or an access node and a local telephone exchange are defined in the ETSI (European Telecommunications and Standards Institute) standards of the ETS 300 324 and ETS 300 347 series. V5 interfaces enable subscribers belonging to a physically separate access network to be connected to a telephone exchange using a standard interface. A dynamic concentrator interface (V5.2) defined by the ETS 300 347 standard series consists of one or more (1–16) PCM (Pulse Code Modulation) lines. One PCM line comprises 32 channels, each with a transfer rate of 64 kbit/s, i.e. 2048 kbit/s altogether. The V5.2 interface supports analogue telephones as used in the public telephone network, digital, such as ISDN (Integrated Services Digital Network) basic rate and primary rate interfaces as well as other analogue or digital terminal equipment based on semi-fixed connections.

A V5 interface may comprise a maximum of 16 2-mbit/s links (PCM lines/connections). Each link in the V5 interface is marked with a link identity number, link ID. The link ID must be the same at both ends of the V5 interface, i.e. at the local exchange end and at the access node end.

A link identification procedure is used for the verification of link identifiers for a certain link. Link identification is generally started after normal operation of a link is restored after a malfunction when the V5 interface is restarted or when a request for link identification is sent via an interface for the management of the V5 interface. The V5 System Management program block of the network element is responsible for link identification. In a network element, an identification procedure for only one link may be active at a time.

Standards ETS300 377-1 (ETSI) and Q.824.5 (ITU-T draft) define a V5.2 interface link identification interface for a network element, which identification interface is started via a management interface. The response to be given to the management interface regarding link identification is accurately defined (Notification: Check Link ID Result) and the response may be: (0) link identification carried out and identification successful (Link ID OK), (1) link identification carried out and identification unsuccessful (Link ID Not OK), and (2) link identification request rejected by the network element at the other end (Link ID Rejected).

If the System Management program block is unable to start the link identification procedure in the network element whose management interface is being used to start the procedure, then a problem arises. If the computer responsible for network management which is trying to start the link identification procedure via the management interface does not receive a controlled or defined response to its request, the result is an indefinite situation where the system does not necessarily know how to proceed. This impairs the performance of the network management computers if there is no sensible response from the network element to the link identification request within a reasonable time. In addition, if the operator responsible for network management does not get an explicit response from the network element, then it will take longer and be more difficult to eliminate the malfunction.

There are many factors that may cause rejection of a link identification request locally in a network element. The link may be in a condition that prevents the activation of the link identification function; for instance, the link may have a connection failure. In addition, a link identification procedure may be going on in another link, in which case, according to the standards, other link identification requests will be rejected. The standards do not take this situation into account at all, and none of the responses described in them is applicable in the situation in question.

BRIEF DESCRIPTION OF THE INVENTION

The object of the present invention is to eliminate the problem described above. A specific object of the present invention is to disclose a new and improved method for the management of link identification and the V5 interface so that the system will never get into an indefinite condition under any circumstances.

A further object of the invention is to disclose a method and system which provide an unambiguous and controlled function and response to link identification started via a management interface in cases where link identification is unsuccessful due to a cause detected by the V5 Interface System Management of the network element through which the link identification procedure is started.

As for the features characteristic of the present invention, reference is made to the claims.

The present invention concerns a method for the management of a V5 interface in a telecommunication system. The telecommunication system comprises a first network element, which may be a local exchange, an a second network element, which may be an access node connected via a V5 interface to the local exchange, and a management interface connected to different network elements. Moreover, the telecommunication system may comprise a cascaded V5 interface, in which case the first network element is connected to the second network element via a first V5 interface. The second network element is further connected to the local exchange via a second V5 interface.

Via the management interface, various commands in the MML command language (Man Machine Language, MML) relating to network management can be supplied to the network elements. The management interface is connected to a network for the management of the telecommunication network, the management network generally being a separate network within the telecommunication network.

In the method of the invention, link identification is carried out when a standard link identification request is supplied via a management interface to a network element, such as a local exchange or access node, or when otherwise necessary for the operation of the interface.

According to the invention, when link identification is requested locally via a management interface in one network element and when the link identification procedure cannot be started via this network element, a notification of unsuccessful link identification is given locally to the management interface.

The invention makes it possible to achieve unambiguous and controlled operation and response in a situation where link identification started via a management interface fails. There are many different causes that may lead to a failure of link identification, as described above. In addition, the invention provides a way to reduce the workload of network management computers and clarify their operation as they can be given a correct and defined response in all situations.

If a link identification process is going on for another link in the network element in question at the same time, then, in an embodiment of the invention, a new link identification request can be placed in queue in this network element and subsequently processed in due course when the condition of the network element permits it. If link identification cannot be started at all e.g. because of a failure or congestion in the link, this situation can be predicted by sending the network element an inquiry regarding the condition of the network element or link before issuing a link identification request.

If link identification fails and the network management computer or the operator receives a controlled response from a defective network element, then link identification can be started via another network element. In this case, the operator will be able to eliminate the malfunction faster, thus improving the reliability of the telephone network.

The system of the invention for the management of a V5 interface in a telecommunication system comprising a local exchange, an access node connected to the local exchange via a V5 interface, and a management interface connected to different network elements comprises means for giving a standard link identification request from the local exchange or access node.

According to the invention, the system comprises means for giving a notification of failure of link identification locally to the management interface when link identification is requested via the management interface and when link identification cannot be carried out in the network element through whose management interface the link identification request is given. The response given by the network element for controlled rejection of a link identification request could be of the form: Reject from local site. As for the advantages of the system of the present invention, reference is made to the advantages of the method presented above.

In addition, the system of the invention may comprise means for implementing queueing so that a link identification request received from the management interface can be placed in queue to wait until the network element is restored to a condition that allows link identification to be carried out. In this case, a message indicating that the link identification request has been placed in queue can be sent to the management interface. These messages can be repeated at regular intervals. The queueing provides the advantage that the network management computer need not renew its link identification request after a failure or rejection of the first request.

In an embodiment of the invention, the system may comprise means for verifying, from the network element via the management interface before giving a link identification request, the condition of the network element and link and whether it is possible to start the link identification process. This makes it possible to determine beforehand whether it is at all worth while requesting link identification in the network element in question. In this way, the occurrences of indefinite conditions in the telephone network can be reduced.

In an embodiment of the invention, the system may also comprise means for starting link identification via a second network element in the case of a failure of link identification via a first network element. This allows faster reparation of possible failure situations in the first network element.

In the following, the invention will be described by the aid of a few preferred examples of its embodiments with reference to the attached drawing, wherein

DETAILED DESCRIPTION OF THE INVENTION

Figure 1:
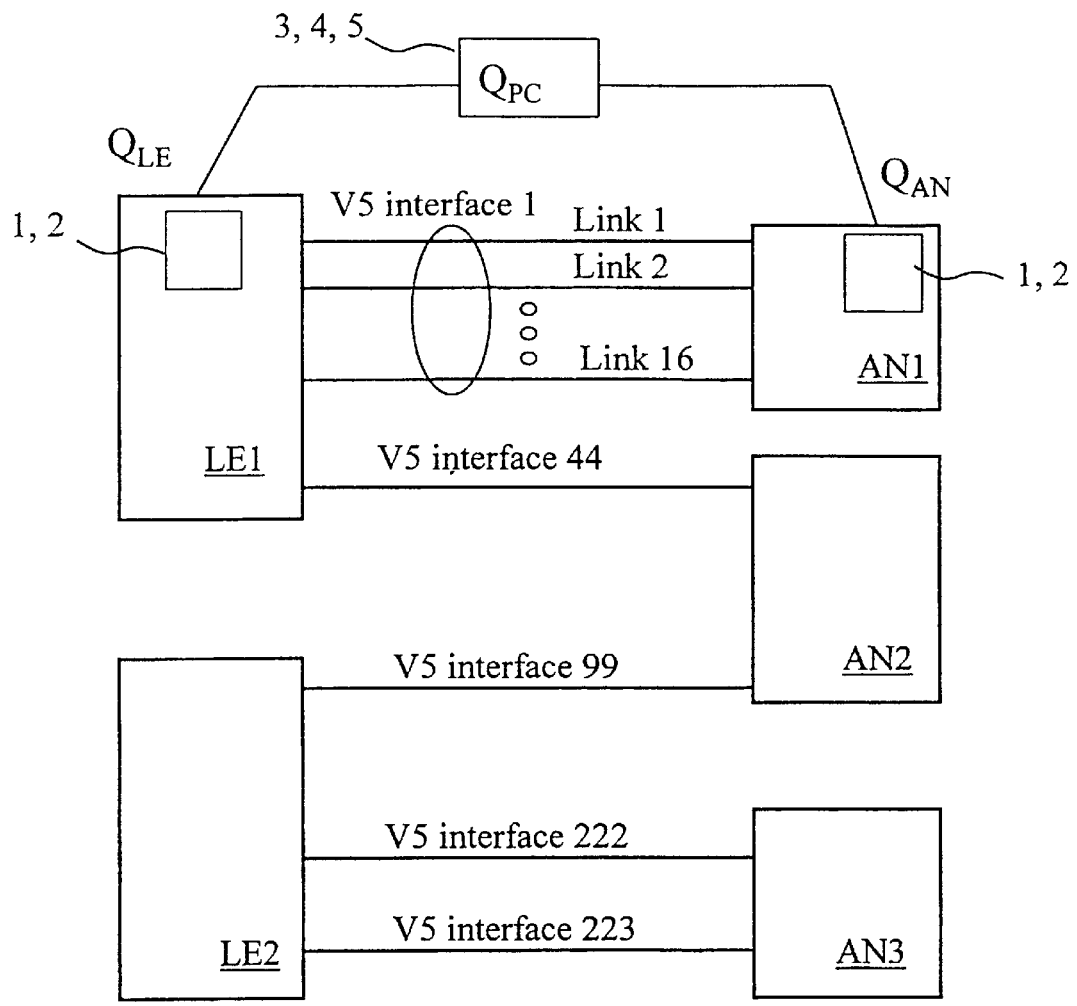
FIG. 1 represents a network structure according to the present invention.

FIG. 1 presents a diagram representing an example of the system of the present invention. The system comprises local exchanges LE1 and LE2, to which subscribers (not shown) are connected in the normal manner. Connected to the local exchanges are access nodes AN1, AN2 and AN3. Access node AN1 is connected to local exchange LE1 via a V5 interface whose interface identity code is 1. This interface comprises 16 links implemented using 2 Mbit/s PCM lines. Access node AN2 is connected via V5 interface 44 to local exchange LE1 and via V5 interface 99 to local exchange LE2. Access node AN3 is connected via V5 interface 222 and V5 interface 223 to local exchange LE2. The V5 interface may comprise 1–16 links. Each V5 interface has an identifier that is unique in the entire telecommunication network, whereas the link identifier is only unique within a single interface.

Implemented in local exchange LE1 is management interface $Q_{LE}$, and in access node AN1, management interface $Q_{AN}$. These network elements LE1, AN1 can be controlled by a network management computer $Q_{PC}$ via the management interfaces $Q_{LE}$, $Q_{AN}$. The management interface and its structure are defined in the appropriate standards.

Moreover, the system presented in FIG. 1 comprises means 1 for giving a notice of failure of link identification. The system comprises means 2 for implementing queueing of link identification requests received from a management interface if the network element is unable to start a link identification process as requested. FIG. 1 presents these means 1, 2 diagrammatically and they can be implemented using suitable software, e.g. as System Management program blocks. The system comprises means 3 and 4 for verifying, from the network element via the management interface $Q_{LE}$, $Q_{AN}$, the condition of the link and whether it is possible to start the link identification procedure.

This verification is generally performed before a link identification request is issued, in order to avoid unnecessary rejection messages, which are used to reject a link identification request given from a management interface to a network element. The system also comprises means 5 for starting link identification via a second network element LE1, AN1 if link identification via a first network element AN1, LE1 fails. These means 3, 4, 5 can be implemented e.g. using suitable program blocks in the network management computer.

Figure 2:
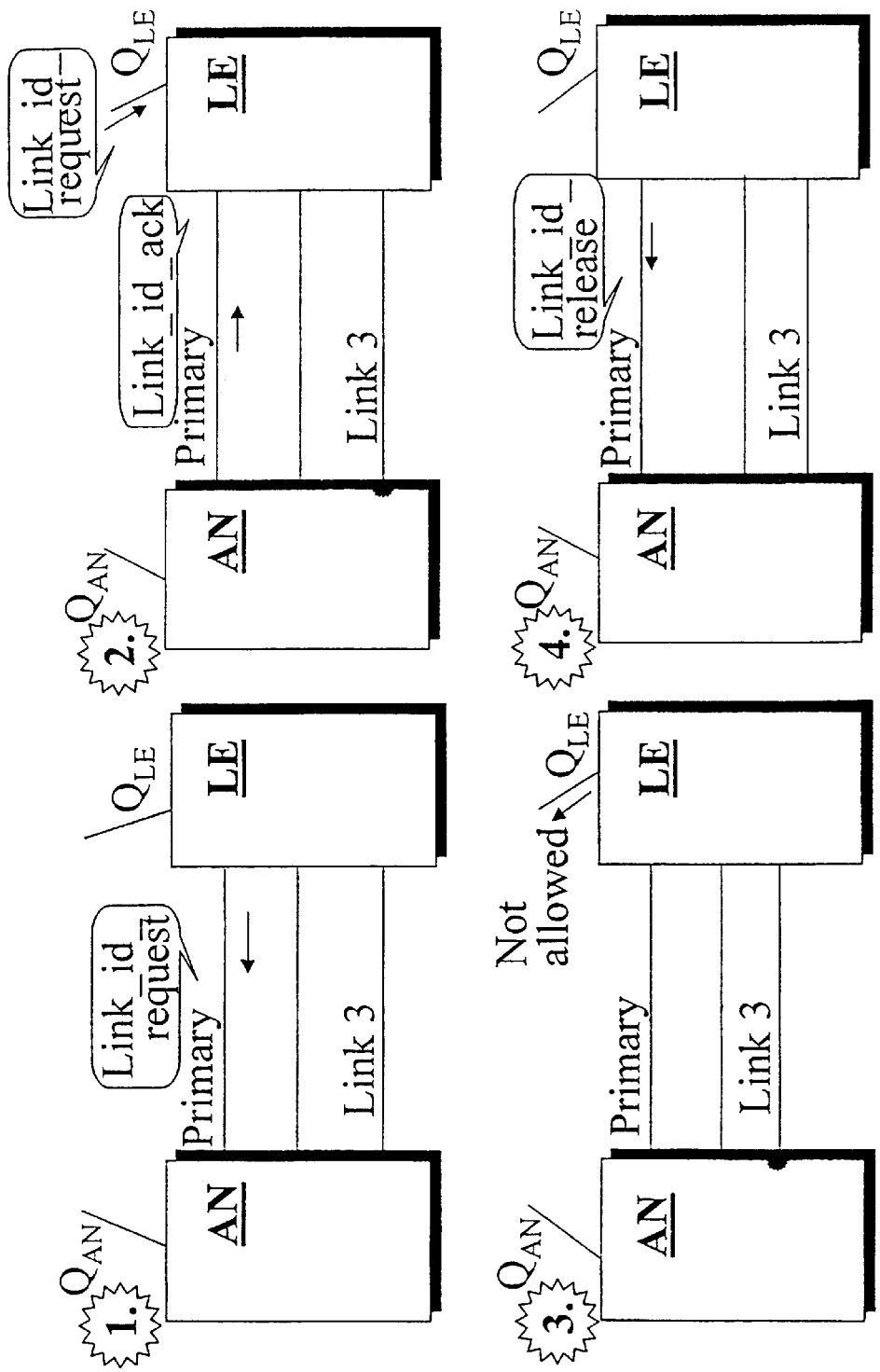
FIG. 2 represents link identification and an implementation according to the present invention.

FIG. 2 presents an example illustrating the operation according to the present invention. At stage 1, the System Management of the local exchange starts a link identification procedure. A link_id_request message is sent to access node AN over a primary link. At stage 2, the access node AN responds to the link identification request by sending a link_id_ack message over the primary link and starts transmitting a link identification signal over link 3. Upon receiving the response, local exchange LE starts a process for monitoring the link identification signal. The primary link is a link consistent with the V5 standard, used primarily for the transmission of protocols in the V5 interface.

At the same time, at stage 2, a link identification request link_id_request is received from management interface $Q_{LE}$. As the local exchange has another link identification procedure active, it cannot start a new procedure. Therefore, according to the invention, the local exchange LE notifies the management interface $Q_{LE}$ that link identification cannot be started from this network element. The notification may be of the form: Reject from local site. After this, the local exchange continues its normal procedure, stage 3.

At stage 4, the local exchange LE detects a link identification signal on link 3 and ends the link identification procedure. The procedure is ended by sending a link_id_release message from the local exchange to the access node. Based on this, the access node AN stops sending the link identification signal and continues the normal operation.

At stage 3, according to the invention, another possibility would be to place the link identification request received from the management interface $Q_{LE}$ in queue at the local exchange and at stage 4, after the local exchange has detected the link identification signal and ended the first link identification procedure, for the local exchange to take the next link identification request from the queue and start a new link identification procedure. Similarly, a query could have been sent from management interface $Q_{LE}$ to find out the situation before sending a link identification request and establish that link identification is not possible. In this way, it would have been possible to remain waiting until the network element is released, even before issuing a request.

Figure 3:
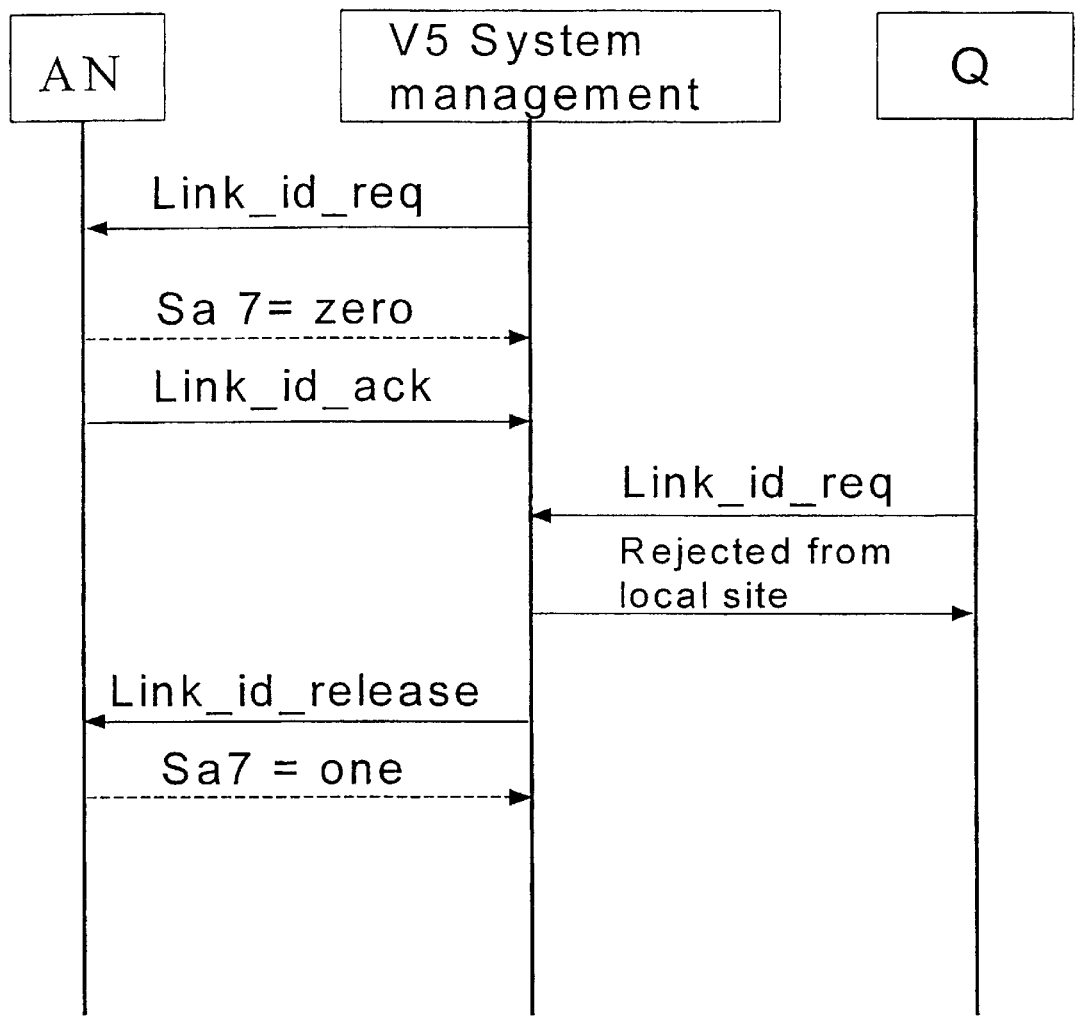
FIG. 3 presents a signalling diagram for a preferred embodiment of the present invention.

The signalling diagram presented in FIG. 3 illustrates the signal traffic in the access node AN when a local link identification request is given from a management interface Q. In this example, the V5 System Management program block sends a link identification request link_id_req to the access node. Based on the request, the access node starts transmitting a link identification signal. In practice, the link identification signal used is the Sa7 bit=0 in time slot T0 of the link. After the value of the bit has been changed to zero, the access node sends an acknowledgement message link_id_ack.

While the link identification procedure is going on, a corresponding link identification request link_id_req is received from a management interface Q. According to the invention, as link identification procedure is going on and link identification cannot be started locally, a message is sent to the management interface, rejecting link identification in a controlled manner. The message may be e.g. 'Rejected from local site'.

The link identification procedure started first is terminated after the V5 System Management has identified the link. The identification procedure is ended using a link_id_release message. Upon receiving this message, the access node changes the value of the Sa7 bit to 1.

The present invention is not restricted to the examples described here, but many variations are possible within the scope of the inventive idea defined by the claims.

What is claimed is:

1. Method for the management of a V5 interface in a telecommunication system comprising a first network element, a second network element, wherein the second network element is connected to the first network element via the V5 interface, the method comprising the steps of:

performing a link identification, using a management interface, based on a standard request issued from a network element corresponding to the management interface being used to perform the link identification, and issuing a notice of failure to the management interface, when the link identification is requested via the management interface and when the requested link identification cannot be started in the network element corresponding to the management interface being used to perform the link identification.

2. Method as defined in claim 1, wherein the link identification request received from the management interface is placed in a queue to wait until the network element is restored to a condition that allows link identification to be carried out.

3. Method as defined in claim 1, wherein before a link identification request is issued, a verification is carried out from the network element corresponding to the management interface being used to perform the link identification via the management interface to establish the condition of the network element corresponding to the management interface being used to perform the link identification and whether it is possible to start the link identification procedure.

4. Method as defined in claim 1, wherein before a link identification request is issued, a verification is carried out from the network element corresponding to the management interface being used to perform the link identification via the management interface to establish the condition of the link to be identified and whether it is possible to start the link identification procedure.

5. Method as defined in claim 1, wherein if link identification via the first network element fails, then a link identification procedure is started via the second network element.

6. Method as defined in claim 1, wherein the notice contains information indicating that the link identification request has been rejected locally.

7. A system for the management of a V5 interface in a telecommunication system comprising a first network element, a second network element, wherein the second network element is connected to the first network element via a V5 interface, and a management interface, said system comprising:

means for issuing a standard link identification request from a network element corresponding to the management interface being used to issue the link identification request, and means for issuing a notice of failure of link identification locally to the management interface when the link identification is requested via the management interface and when the link identification procedure cannot be started in the network element corresponding to the management interface being used to issue the link identification request.

8. System as defined in claim 7, wherein the system comprises means for implementing queuing to allow a link identification request received from the management interface to be placed in a queue to wait until the network element is restored to a condition that allows link identification to be carried out.

9. System as defined in claim 7, wherein the system comprises means for a verifying, from the network element corresponding to the management interface being used to issue the link identification request via the management interface before a link identification request is issued, the condition of the network element corresponding to the management interface being used to issue the link identification request and whether it is possible to start the link identification procedure.

10. System as defined in claim 7, wherein the system comprises means for verifying, from the network element corresponding to the management interface being used to issue the link identification request via the management interface before a link identification request is issued, the condition of the link to be identified and whether it is possible to start the link identification procedure.

11. System as defined in claim 7, wherein the system comprises means for starting the link identification procedure via the second network element if link identification via the first network element fails.

* * * * *